April 5, 1932.                    E. J. HUBBARD                    1,852,243
                                       REEL
                              Filed Nov. 13, 1929
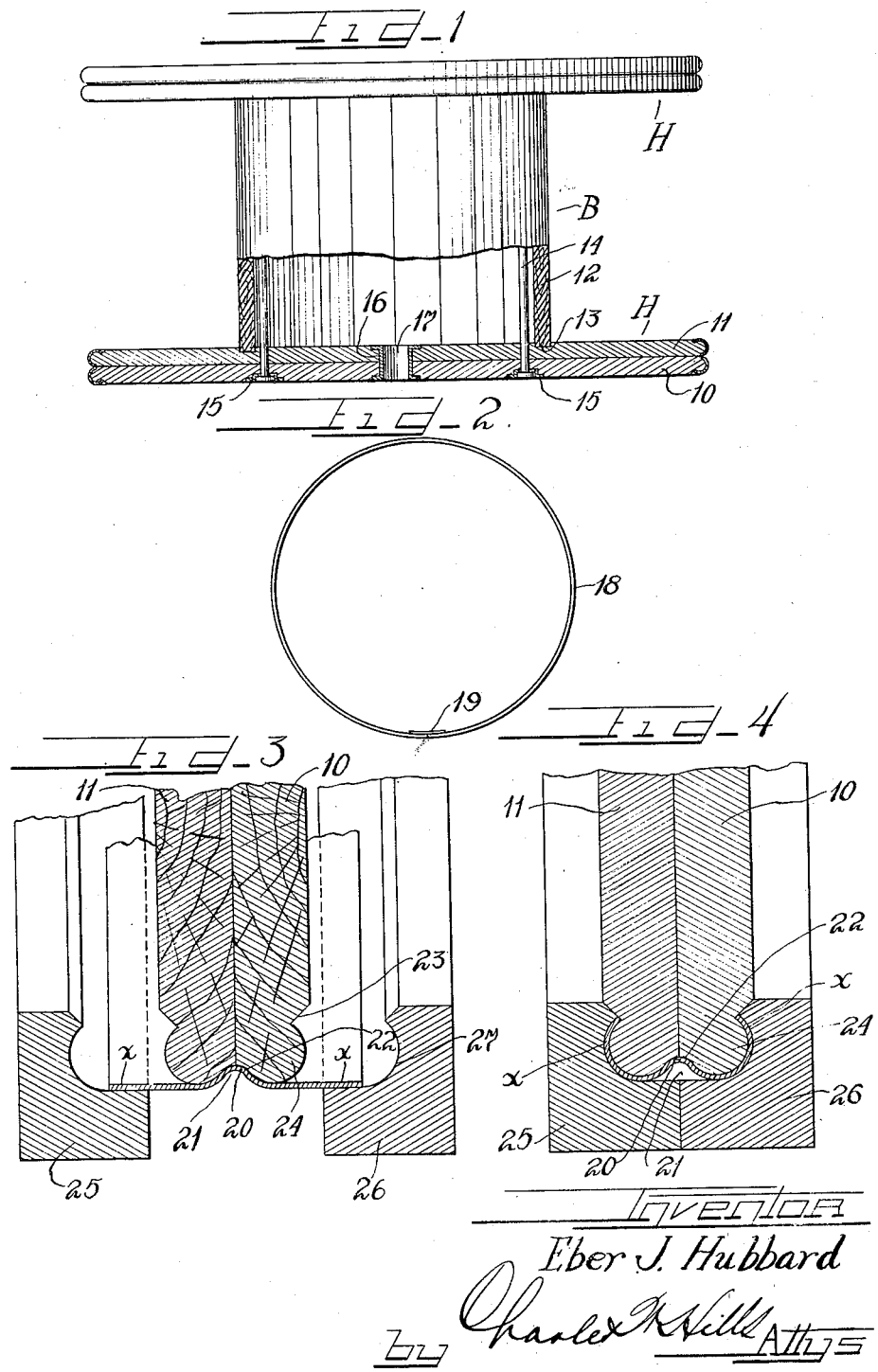
Inventor
Eber J. Hubbard
by Charles K. Wills Attys Patented Apr. 5, 1932

1,852,243

UNITED STATES PATENT OFFICE

EBER J. HUBBARD, OF BERWYN, ILLINOIS

REEL

Application filed November 13, 1929. Serial No. 406,772.

This invention relates to spools or reels and particularly to such structures in which the heads are composed of laminations or layers of non-metallic material, such as wood.

The important object of the invention is to provide sheet metal reinforcing and strengthening tires for the heads so applied as to firmly and snugly surround and clamp the peripheral sections of the heads and with the sides of the tires deflected into intimate clenching engagement with such peripheral sections.

Referring to the drawings:

Figure 1 is a side elevation, partly in diametrical section, of a reel to which the invention is applied;

Figure 2 is a side elevation to reduced scale of a circular sheet metal band from which the tire is to be formed;

Figure 3 is an enlarged diametral section of part of a reel head and of die members, and showing the manner of forming and applying the tire; and Figure 4 is a similar sectional view showing the tire fully applied.

The reel shown comprises the hub or barrel B and the end disks or heads H. Each head is built up preferably of two integral disks 10 and 11, although each disk could be built up of layers or laminations. The disks are preferably of non-metallic material such as wood. When of wood the disks are secured together with the grain of one disk at right angles with that of the other disk.

The barrel B is cylindrical and may be of sheet metal, or, as shown, may be built up of wooden staves 12 which have their ends engaged in the annular grooves 13 provided in the inner disks 11 of the heads. Bolts 14 extending through the heads and through the interior of the barrel serve to securely lock the heads to the barrel. Countersunk washers or cups 15 receive the heads and nuts of the bolts so that the outer faces of the washers and the bolt heads and nuts are flush with or within the outer faces of the outer disks 10 of the heads. Each head has an axial opening 16 lined by a bushing 17 whose ends are deflected into the adjacent sides of the head and with the outer faces of the bushing flush with the outer faces of the head. These bushings serve to receive a shaft or spindle on which the reel is to be turned. These bushings also serve to clamp and hold together the head disks at their axes.

The heads of spools or reels are exposed to considerable wear and tear, this being particularly true of larger reels which support heavy material such as wire and which are moved usually by rolling on the heads.

The important object of this invention is to provide a metal reinforcement or tire for each head applied to securely encompass and clinch the peripheral sections of the disks forming the head so as to clamp the disks securely together at their peripheries and also to lock itself securely in place against loosening or displacement.

Referring to Figure 2, a sheet metal strip is bent or rolled to form the plain circular band 18 from which the tire is to be formed. The ends of this band are secured together as by means of a splice plate 19 of thin sheet metal soldered, brazed or welded to the band ends. After the ends have been secured together the band is rolled in order to produce the internal annular ridge or bead 20 therein which at its outside forms the annular groove 21 midway between the outer edges of the band.

Referring to Figure 3, the disks 10 and 11 of a head structure are now slipped into the band from opposite sides thereof, these disks having been previously formed with their inner peripheral edges recessed for receiving the opposite sides of the ridge 20. When the head disks are brought together in the band, their recessed edges form an annular groove 22 for accurately and snugly receiving the ridge 20 of the tire band.

The head disks have also annular recesses 23 in their outer sides a short distance radially inwardly from the ridge 20, and the outer edges of each disk between the ridge 20 and recess 23 is rounded so that the outer peripheral edge part 24 of each disk will be of substantially semicircular cross-section, and around these parts, the ends $x$ of the tire band are deflected to form clinching engagement therewith. Such clinching application of the sides *x* of the band may be accomplished by suitable die members 25 and 26. The die members shown are similar and annular and each has a shaping channel 27 for deflecting the ends *x* and securely applying them around the peripheral parts 24 of the head disks. When the die members are brought together the surfaces of the channels 27 cause the proper deflection and bending of the band sides *x*; and, as shown in Figure 4, these sides are deflected into intimate engagement with the periphery parts 24 so that these parts 24 will be encompassed and securely clenched and clamped by the deflected tire sides. The ends of the tire sides are then within the recesses 23 and not only will the tires then securely clamp the head disks together at their peripheries but the tire will also lock itself securely to the head. Preferably the application is such that the side faces of the applied tires will be flush with the side faces of the heads so that the reels can be accurately stacked and so that the tires will not interfere with the winding on or unwinding from the reels of wires or other material.

The annular ridge 22 in the tire provides the outer groove 21 for receiving a belt by which the reel is to be turned or braked, and such ridge also forms a seat or base between which and the deflected sides of the tire the head disk peripheral parts 24 are intimately received and clamped.

It will be noted that the semi-circular sides of the applied tire structure and the projections of the ends thereof a considerable distance within the outer faces of the head produces a very strong reinforcing and clamping structure which is very resistant to blows or bumps, the direction of blows or bumps being through the radius center of the semi-circular sides of the tire so that bumps or billows, instead of tending to spread and loosen the tire structure, will tend only to force its sides more intimately against and around the head peripheral parts 24.

Having described my invention, I claim as follows:

1. A spool or reel comprising a barrel and head structures secured thereto, each head structure comprising two similar disks, each disk having its inner edge recessed and said recesses joining to form an annular groove, each disk on its outer side having an annular recess a short distance radially inwardly from said groove, the peripheral section of each disk between said groove and the corresponding recess being of substantially semi-circular cross section, and a sheet metal tire deflected into said groove and having its sides deflected around said semi-circular sections with their ends extending into said recesses whereby said tire clamps said disks together and clinches itself thereto.

2. A spool or reel comprising a barrel and head structure secured thereto, each head structure comprising two disks of non-metallic material, the adjacent peripheral edges of said disks being cut away to leave an annular peripheral groove, each disk in its outer side having an annular recess a short distance inwardly from said groove the peripheral section of each disk between said groove and the recess being rounded to present a surface of arcuate curvature, a sheet metal tire deflected intermediate its sides to fit in said groove and having its sides deflected intimately against and around said arcuate surfaces with the ends thereof extending into said recesses, the outer surfaces at the sides of said tire being flush with the outer sides of said disks.

3. In a spool or reel of the class described, a head structure comprising cylindrical halves of non-metallic material, each half having its inner edge recessed and said recesses joining to form an annular groove, each half at its outer side having an annular recess a short distance radially inwardly from said groove, the peripheral section of each half between said groove and the corresponding recess being of substantially semi-circular cross-section, and a sheet metal tire deflected into said groove and having its sides deflected around said semi-circular sections with their ends extending into said recesses whereby said tire clamps said halves together and clinches itself thereto.

In testimony whereof I have hereunto subscribed my name at Chicago, Cook County, Illinois.

EBER J. HUBBARD.